United States Patent
Sevilmis et al.

(10) Patent No.: US 9,104,561 B2
(45) Date of Patent: Aug. 11, 2015

(54) FAILURE MODE IDENTIFICATION AND REPORTING

(75) Inventors: Tarkan Sevilmis, Redmond, WA (US); Arshish Cyrus Kapadia, Issaquah, WA (US); Maxim Lukiyanov, Redmond, WA (US); Tittu Jose, Sammamish, WA (US); Gheorghita Irimescu, Sammamish, WA (US); Janak Madhusudan Agarwal, Redmond, WA (US); Stephen John Clark, Bellevue, WA (US); Hardik Shah, Seattle, WA (US); Sreekanth Lingannapeta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 13/614,301

(22) Filed: Sep. 13, 2012

(65) Prior Publication Data
US 2014/0075248 A1    Mar. 13, 2014

(51) Int. Cl.
G06F 11/00    (2006.01)
G06F 11/07    (2006.01)
G06F 11/34    (2006.01)

(52) U.S. Cl.
CPC .......... *G06F 11/0715* (2013.01); *G06F 11/079* (2013.01); *G06F 11/0757* (2013.01); *G06F 11/0793* (2013.01); *G06F 11/3466* (2013.01)

(58) Field of Classification Search
CPC . G06F 11/3466; G06F 11/0757; G06F 13/24; G06F 2201/88; G06F 9/4806
See application file for complete search history.

(56) References Cited

U.S. PATENT DOCUMENTS

| | | | |
|---|---|---|---|
| 5,812,133 A * | 9/1998 | Schultz et al. | 715/809 |
| 6,035,419 A * | 3/2000 | Breslau et al. | 714/20 |
| 6,820,155 B1 * | 11/2004 | Ito | 710/262 |
| 6,930,960 B2 * | 8/2005 | Miyake | 368/113 |
| 7,543,192 B2 | 6/2009 | Vaidyanathan et al. | |
| 7,721,152 B1 | 5/2010 | Joshi et al. | |
| 2005/0203786 A1 | 9/2005 | Jessup et al. | |
| 2008/0256384 A1 | 10/2008 | Branson et al. | |
| 2010/0115530 A1 * | 5/2010 | Ahmad et al. | 718/108 |
| 2010/0138694 A1 | 6/2010 | Harrison et al. | |
| 2010/0312522 A1 | 12/2010 | Laberge et al. | |
| 2011/0154367 A1 | 6/2011 | Gutjahr et al. | |
| 2012/0226842 A1 * | 9/2012 | Evans et al. | 710/264 |

OTHER PUBLICATIONS

Adzic, Gojko, "Effective Root Cause Analysis Techniques," Nov. 6, 2010, retrieved from http://agile.dzone.com/news/effective-root-cause-analysis, 3 pp.

Mirgorodskiy et al., "Problem Diagnosis in Large-Scale Computing Environments," Nov. 11, 2006, Proceedings of the 2006 ACM/IEEE SC 2006 Conference, 13 pp.

* cited by examiner

*Primary Examiner* — Charles Ehne
(74) *Attorney, Agent, or Firm* — Tom S Wong; Jim Ross; Micky Minhas

(57) ABSTRACT

When a software component is starting (305), such as but not limited to a task or a subtask, the component pushes (310) its identification (ID) onto a stack. The component then executes (315) its other instructions. If the component completes its instructions so that it can terminate normally (320), then it pops (325) the stack, which removes its ID from the stack. If the component fails, such as by not being able to complete its instructions, then it will not be able to pop the stack so its ID will remain in the stack. Another software process can then read the IDs in the stack to identify (330) which components have failed and can automatically take a specified action (335), such as by sending an email message to, sending a text message to, or calling by telephone, a person or persons responsible for that software component.

18 Claims, 10 Drawing Sheets

| IDENTIFIER | PRIMARY CONTACT NAME | PRIMARY CONTACT TELEPHONE NUMBER | PRIMARY CONTACT EMAIL ADDRESS | PRIMARY TEAM EMAIL ADDRESSES | OTHER INFORMATION |
|---|---|---|---|---|---|
| BBBcoldef | Pat D. | 425-PPP-SSSS | PatD@___.com | | |
| S456 | Amberlyn W. | 425-PPP-SSSS | AmberlynW@___.com | Team2@___.com | |
| S457B3 | Joshua T. | 425-PPP-SSSS | JoshuaT1@___.com | Team6@___.com | |
| Search2012 | Weston K. | 425-PPP-SSSS | WestonK@___.com | Team6B@___.com | |
| SNXtable3 | Sherry G. | 425-PPP-SSSS | SherryG@___.com | Team5@___.com | |
| T123xxA | David L. | 425-PPP-SSSS | DavidL@___.com | Team2@___.com | |

FAILURE MODE IDENTIFICATION AND REPORTING

BACKGROUND

Running or developing software on computing systems, and maintaining or modifying databases, especially with respect to large-scale computing systems such as servers, often requires running multiple processes, some of which may be run simultaneously and others of which may be run sequentially. Each of these processes typically involves one or more tasks, and each task typically involves one or more subtasks. If one or more of these tasks or subtasks fails, the operation of the computing system may be seriously adversely affected and it is often very difficult and time-consuming to identify the software component or subcomponent that caused the problem, or to determine which person or team should be called to remedy the problem.

SUMMARY

The embodiments disclosed herein provide mechanisms for failure mode identification and reporting. In particular, in one implementation, when a software component, such as a program or task begins, information regarding that component is pushed (recorded) onto a stack. If the component ends normally, then the information is popped (removed) from the stack. If the component does not end normally, such as the component "crashing", or component task being terminated due to excessive time, such as being "hung up" or caught in an endless loop then, based upon, for example, the top value (information) in the stack, the component active at the time of the failure may be identified, the status of the component during failure may be identified, and a predetermined action is performed, such as recording information about the non-normal termination in, for example, a dedicated operations log, sending a notice regarding the non-normal termination, delaying sending a notice regarding the non-normal termination until a predetermined event subsequently occurs, and/or performing a predetermined corrective operation.

The predetermined action may be, for example, searching a database to identify at least one "owner", that is, at least one person or at least one team having responsibility for the component, and sending information about the non-normal termination to the owner. The predetermined action may also be, for example, receiving information, such as an error code, regarding the non-normal termination, searching a database for information regarding a preferred corrective operation responsive to the error code, and executing the preferred corrective operation. Preferably, each major component has a stack that is independent of the stack of any other major component.

Similarly, when a software subcomponent, such as a subtask, routine, etc., begins, information regarding the subcomponent is pushed onto the stack and, if the subcomponent terminates normally, the information regarding the subcomponent is popped from the stack. If, however, the subcomponent does not terminate normally then, based upon, for example, the top value (information) in the stack, the subcomponent active at the time of the failure may be identified, the status of the subcomponent during failure may be identified, and a predetermined action is performed. Preferably, a subcomponent uses the stack for the component which invoked (called) the subcomponent.

Preferably, information about a component and its subcomponents are also logged, in a dedicated operations log which is preferably, but not necessarily, separate from the stack, and can include, for example, an identification of each component, the start time of the processing by each component, the end time of the processing by each component, error codes associated with each component, a listing of resources called by each component, and/or an identification of subcomponents initiated by each component, and similar information regarding each subcomponent. Thus, once the owner of a particular component or subcomponent has been identified and notified in the event of a problem, the owner can review the operations log to obtain information regarding the overall environment and the operation of the particular component or subcomponent leading up to the time that the problem occurred.

It should be appreciated that the subject matter described herein may be implemented as a computer-controlled apparatus, a computer process, a computing system, or as an article of manufacture such as a computer-readable storage medium. These and various other features will be apparent from a reading of the following Detailed Description and a review of the associated drawing.

This Summary is a brief and/or simplified introduction to some of the concepts that are described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is an illustration of the identified relationship between tasks, subtasks, and responsible person(s) and/or teams.

DETAILED DESCRIPTION

Figure 1:
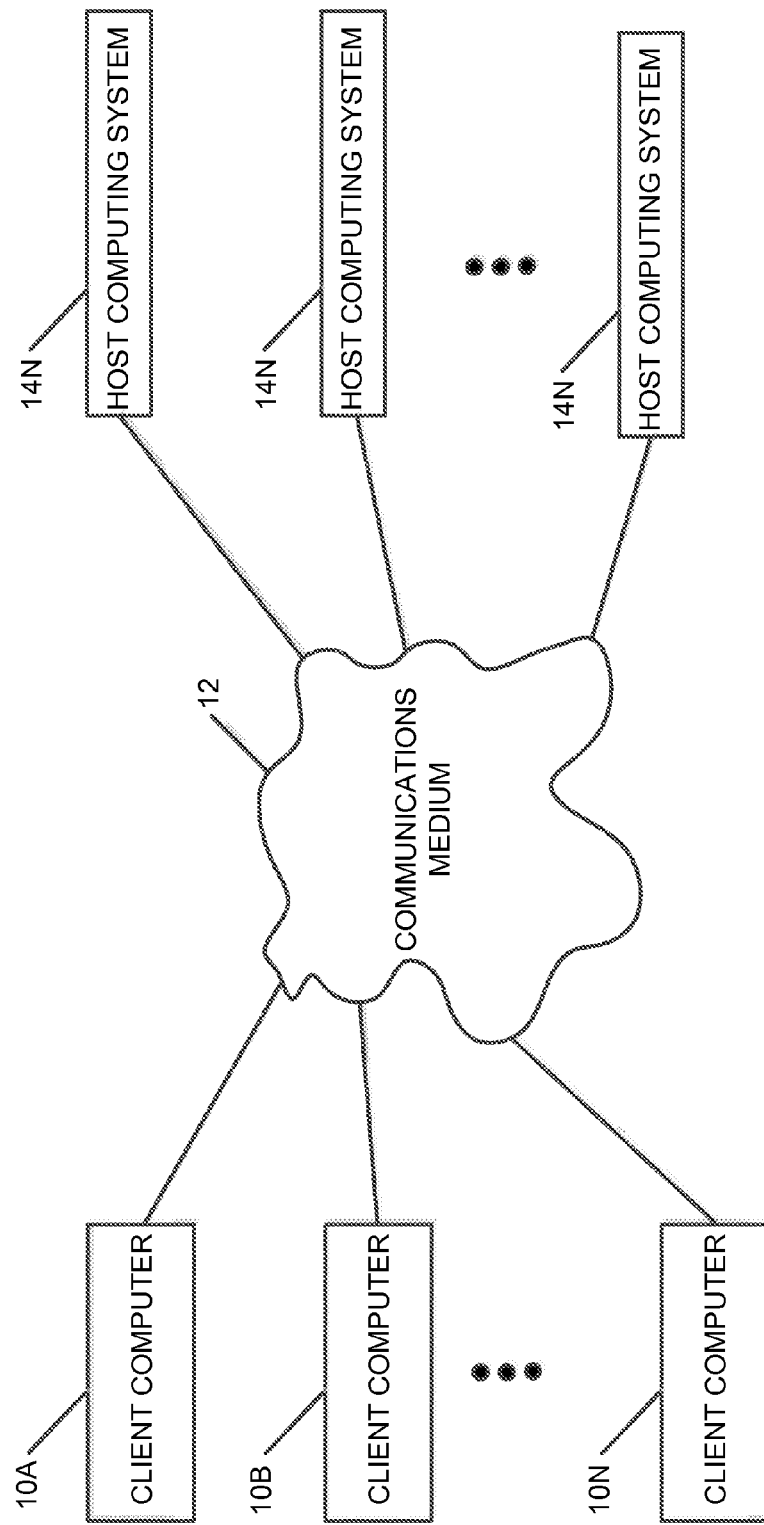
FIG. 1 illustrates an exemplary environment wherein one or more client computers are connected via a communications medium to one or more host computing systems.

The following detailed description is directed to concepts and technologies for failure mode identification and reporting. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawing, in which like numerals represent like elements throughout the several figures, aspects of a computing system, computer-readable storage medium, and computer-implemented methodology for failure mode identification and reporting will be presented.

FIG. 1 illustrates an exemplary environment wherein one or more client (customer, or user) computers 10A-10N are connected via a communications medium 12 to one or more host computing systems 14A-14N. The letter "N" merely indicates an integer number greater than zero, and does not necessarily indicate that the number of client computers 10 is or is not the same as the number of host computing systems 14. For example, there could be 5000 client computers 10A-10N, but only 6 host computing systems 14A-14N. A client computer 10 may be any type of computing platform, for example, a personal computer, a business computer, a tablet, or another type of computing device that hosts one or more programs. The communications medium 12 may be, for example, a local area network (LAN), such as an intranet, a wide area network (WAN), such as the Internet or a Wi-Fi® connection, or some other communications medium which is capable of handling communications and/or transferring data between a client computer and a host computing system.

A host computing system 14 is also a type of computing platform, and can be for providing any necessary or desired service and/or data to the client computer. A host computing system will, therefore, have the programs and/or data necessary to provide the client with the service and/or data. On occasion, however, it may be necessary to update, upgrade, replace, or add one or more programs on a host computing system, or it may be desired or necessary to modify one or more databases on the host computing system, such as changing to a new format or display, or to create new databases using established or new formats. Changes or new features to existing programs, and installations of new programs sometimes conflict with other programs or features, and/or new programs or changes to installed programs may have unknown "bugs", causing the host computing system to exhibit problematic behavior, such as being non-responsive, slow operation, and/or crashing. When such problematic behavior occurs it is desirable to quickly, efficiently, and automatically identify the software causing the problem and the person(s) or team(s) responsible for the software, and to provide information to the responsible party for use in identifying and correcting the problem. For convenience of discussion herein, and not as a limitation, the host computing systems 14 are presumed to be data centers.

Also for convenience of discussion, and not as a limitation, a major or higher-level software component is generally referred to herein as a process or program, a software component which is called by, is invoked by, or operates under the control of, the process or program is generally referred to herein as a task, and a software subcomponent which is called or invoked by a software subcomponent is generally referred to herein as a subtask.

Figure 2:
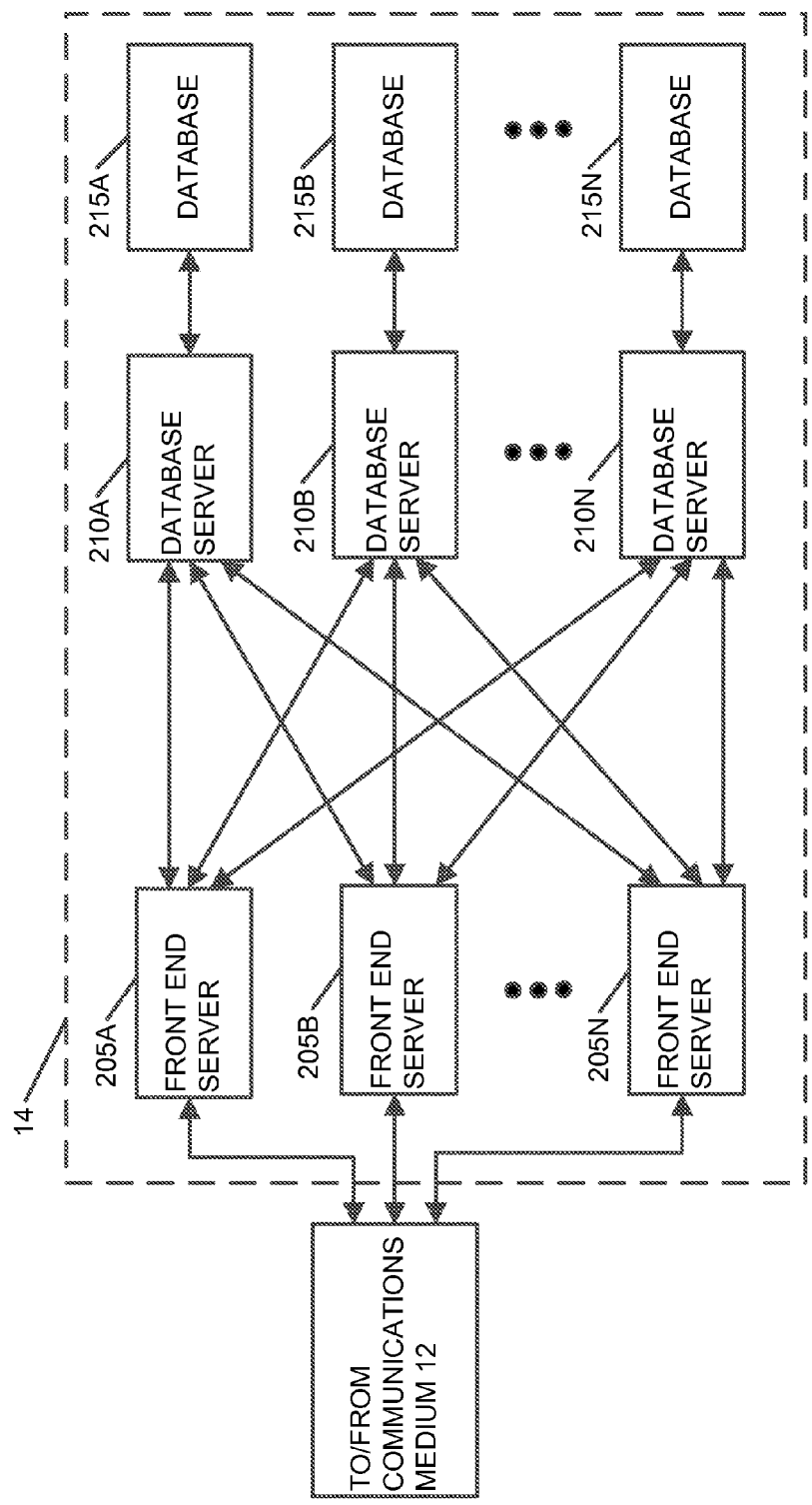
FIG. 2 illustrates a block diagram of the architecture of an exemplary host computing center, such as a data center.

For convenience of discussion herein, and not as a limitation, the host computing systems 14 are presumed to be data centers. FIG. 2 illustrates a block diagram of the architecture of an exemplary host computing center 14, such as a data center. An exemplary data center may have front end servers 205A-205N, database servers 210A-210N, and databases 215A-215N. The front end servers 205 are connected to one or more of the client computers 10 via the communications medium 12. These front end servers interface with the client computers and may provide, for example, security measures (e.g., password or other protection), logon screens, user interface screens for a user to enter a query, result display screens for a user to view the results of the query, and/or conversion of the query from a user format to a database server language, for example, but not limited to, a structured query language (SQL), etc. The database servers 210 receive the query from a front end server 205 and search one or more of the databases 215A-215N for the specified terms, and return the results of the search to the requesting front end server 205 for formatting, if necessary, and forwarding to the requesting client computer 10. Preferably, but not necessarily, each front end server 205 is connected to all of the database servers 210. The databases 215A-215N contain data, which may be, for example, numbers and/or text, tables, pictures, drawings, charts, presentations, web pages, etc.

A query from a client at, for example, client computer 10A, travels over the communications medium 12 to, for example, front end server 205A, which reformats the query if necessary and, preferably, provides it to one or more of the database servers 210. Each database server 210 queries its associated database 215 and returns the results to the front end server 205A, which reformats the results if necessary and forwards them to the client computer 10A via the communications medium 12. Alternatively, some databases 215 may be restricted access databases, or may be backup databases, in which case a front end server 205 might send the query only to selected ones of the database servers 210.

Consider now that it is desirable or even necessary to modify or install a new program on a server 205 or 210, or even to modify a database 215. A programmer, service technician, or other such qualified person(s) (not shown) will run the necessary program(s) to perform the desired installations or changes. Preferably, instructions to implement the operations described herein are part of each new task or subtask added to a program or process and, even more preferably, existing tasks and subtasks are revised to include such instructions.

Figure 3:
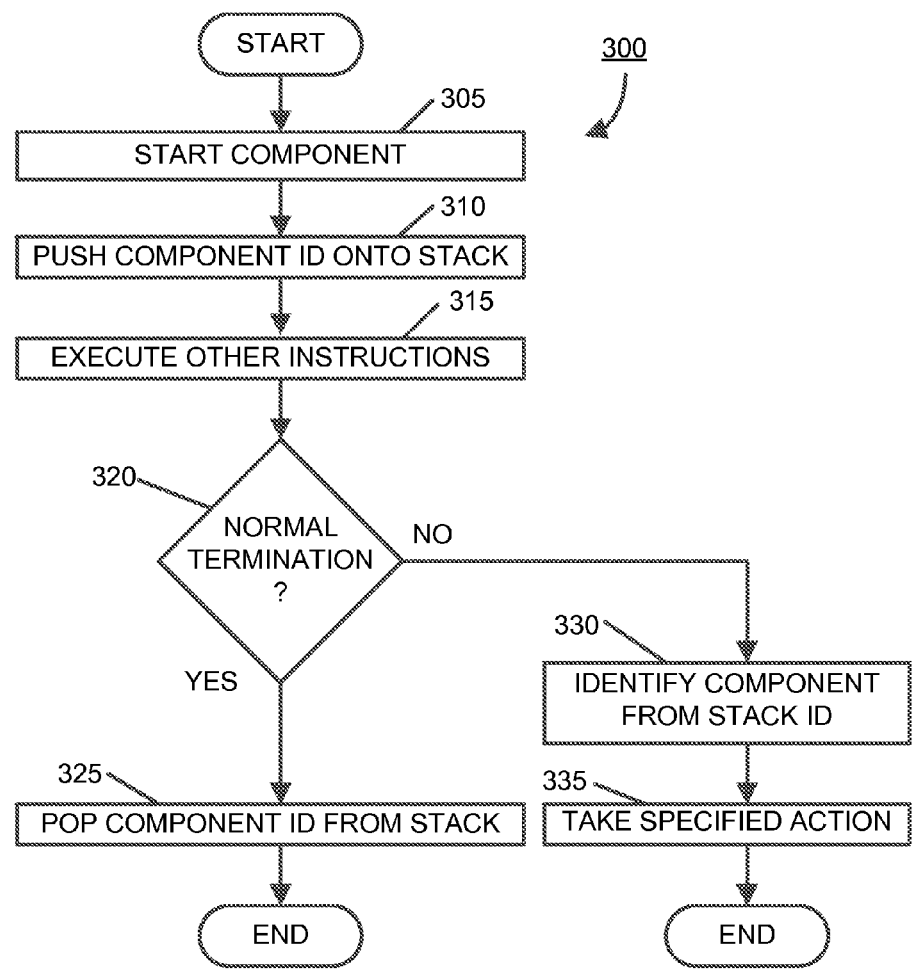
FIG. 3 is a flowchart of an exemplary, simplified procedure illustrating the operation of a server.

FIG. 3 is a flowchart of an exemplary, simplified procedure 300 illustrating the operation of a server 205 or 210. When a software component or subcomponent, such as but not limited to a program, process, task, or subtask, begins 305, it executes instructions to push 310 its component identification information (ID) onto a stack. The ID preferably includes, but is not necessarily limited to, a name or other unique identifier for that component. The component then executes 315 other instructions. If at operation 320 the component terminates normally then, prior to ending, it executes instructions to pop 325 its component ID off of the stack. If desired, other action may also be taken at that time, such as, but not limited to, recording the starting or ending times, the number of instructions executed, memory used, etc. This information may be useful for other or future analysis, engineering/software development, etc. If, however, the component does not terminate normally then it will not perform operation 325. In that case a higher level software component or other program or process will identify 330 the component that failed by getting the component ID from the top of the stack, and then take 335 a specified action or actions. Preferably, the component, such as but not limited to a task, subtask, or sub-subtask, executes the pop instruction as the last instruction before returning control to the higher level component or process. This assures that the component has completed performing all of its tasks. Alternatively, when the component returns control to the higher level component, the higher level component may execute a pop instruction for the stack before the higher level component invokes or calls another component. As mentioned herein, each task preferably has an independent stack, but subtasks use the stack of the task that called it.

Figure 4A:
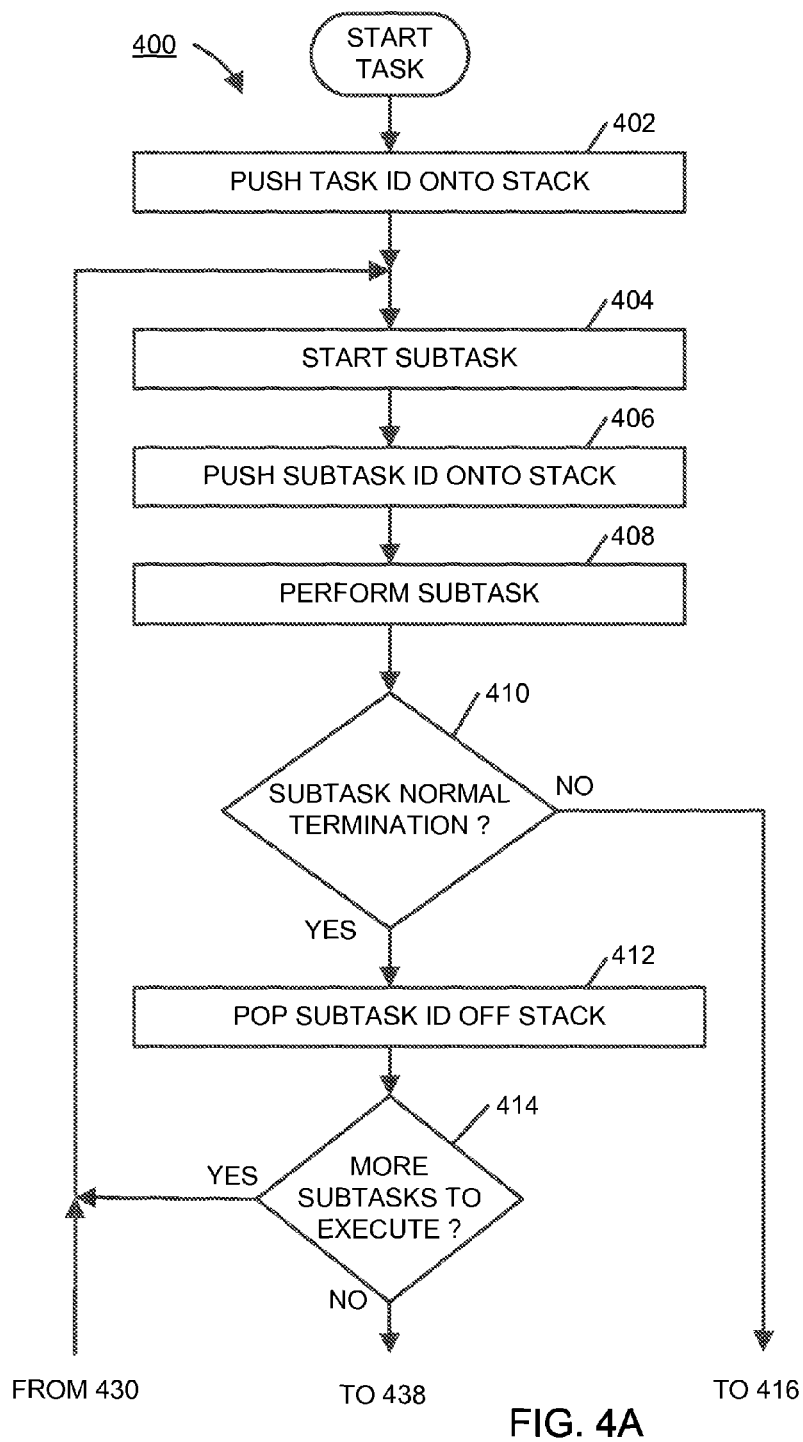
FIGS. 4A-4C are a flowchart of an exemplary, more detailed procedure illustrating the operation of a server.
Figure 4B:
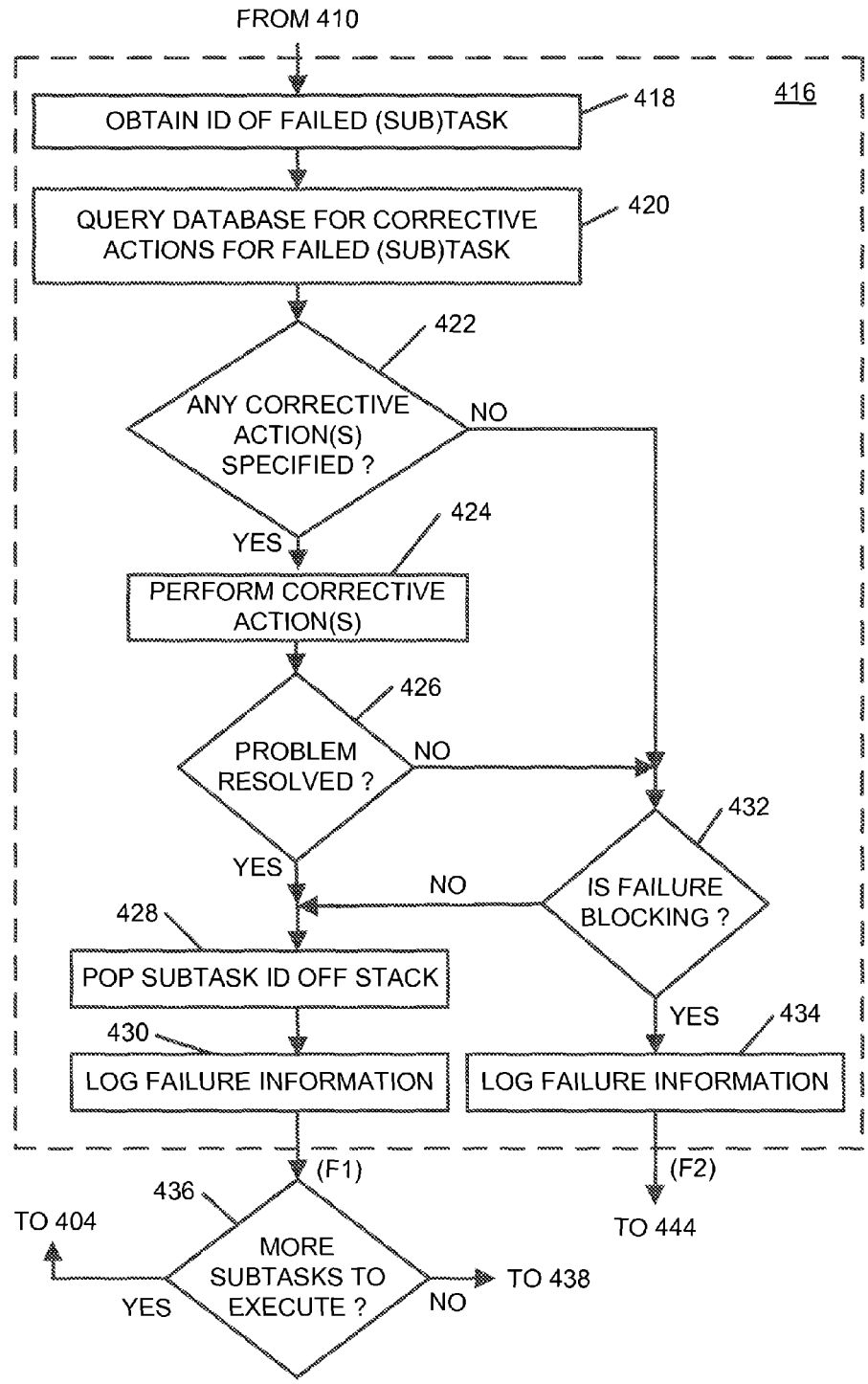
Figure 4C:
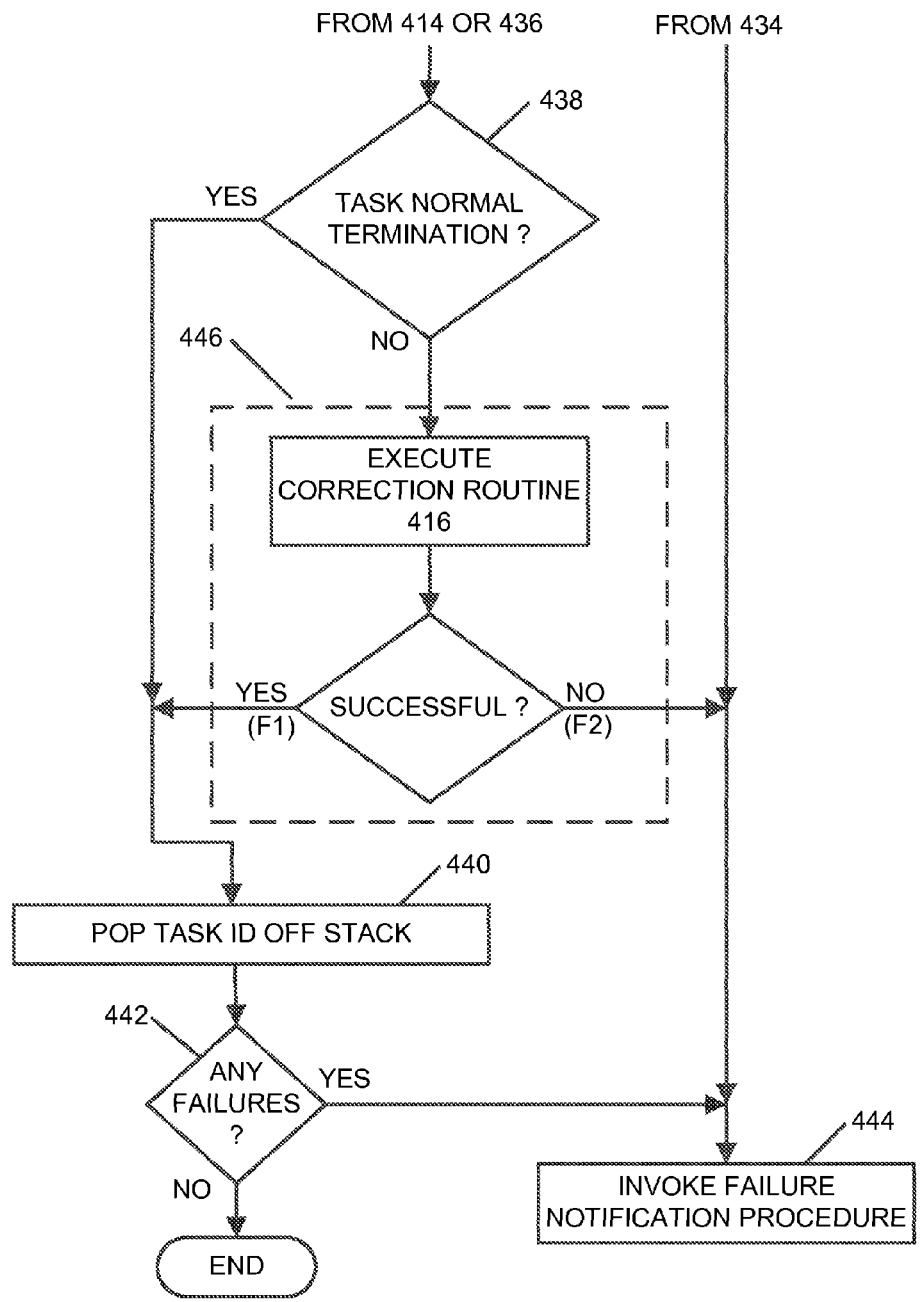

FIGS. 4A-4C are a flowchart of an exemplary, more detailed procedure 400 illustrating the operation of a server 205 or 210. Starting with FIG. 4A, when a task starts it pushes 402 its ID onto a stack. Also preferably, but not necessarily, the instructions to push the component ID onto the stack are at the beginning of the component instructions. A stack for a component is preferably located such that the information in the stack will not be lost or corrupted in the event that any component fails. For example, the stacks for a task running on database server 210A may be in the database 215A, in the front end server 205A, in another convenient database 215B-215N, a different convenient database server 210B-210N, or a convenient front end server 205B-205N. The stack could also be located on the same device that is executing the component.

Assume now that the task calls a first subtask. When a subtask starts 404 it pushes 406 its ID onto a stack but, preferably, the subtask ID is pushed onto the same stack that contains the ID for the task that called the subtask. This makes it easier to determine the source of a failure, especially when other tasks may be simultaneously running numerous other subtasks. The first subtask then performs 408 its operations. If at operation 410 the first subtask did not successfully complete its operation then correction routine 416 of FIG. 4B is executed.

If at operation 410 the first subtask successfully completes its operation then the subtask pops 412 its ID off the stack. If at operation 414 the task needs to execute more subtasks then a return is made to operation 404. If at operation 414 the task does not need to execute more subtasks then operation 438 of FIG. 4C is commenced.

A task, by way of example and not of limitation, is a stand-alone application, or a sequence of instructions treated as a basic unit of work by a supervisory program of an operating system, or even a subprogram, which is run as an independent entity, and which can be run in parallel with other tasks. A task might be, for example, an application, program or subprogram to modify a table in a database. Subtasks are operations or sequences of instructions which are called or invoked by a task. Although subtasks from different tasks might be operating simultaneously, the subtasks under a task operate sequentially. Some subtasks under that task might be, for example: copy the table; change the font used in the copy to Calibri; change the font size used in the copy to 12 point type; change the table headers in the copy to bold; change the background color for the table headers in the copy to yellow; archive the original table; save the modified table; and change any pointers or indexes to the table to point to the modified table.

In addition, subtasks may also call or invoke sub-subtasks, or "child" subtasks. Such sub-subtasks are preferably treated in the same manner with respect to the invoking subtask that a subtask is treated with respect to the invoking task. For example, a sub-subtask operations would preferably use the same stack as the invoking subtask, push or pop its ID on or off of that stack, perform (as a sub-subtask) operations 404, 406, 408, 410, 412, etc.

Turning now to FIG. 4B, in correction routine 416, which comprises operations 418-434, the operation of the failed subtask is obtained 418 by inspecting the topmost ID in the stack. A database is then queried 420 for any corrective action or actions that can or should be taken when that subtask fails. For example, it may be known that this particular subtask tends to have an error if it requests information and that information is not provided quickly enough, in which case the corrective action may simply be to initiate the subtask again. Or it may be known that another process, task, or subtask often leaves a document as being marked "open", even if that process, task, or subtask has completed its use of that document, in which case the corrective action may simply be to force a closure of the document or to proceed with a copy of the document. If at operation 422 any corrective action(s) are specified then at least one of those corrective action(s) is performed 424. If an error code is provided by the system with respect to the non-normal termination, then that error code is preferably used to select a corrective action which is responsive to the error code. If no error code is provided, or if the provided error code does not have a specified corrective action, then either no corrective action will be taken, or the corrective action may be a general action, such as restarting the component or the system.

Although reference is made herein to querying a database to determine any corrective action or actions, it will be appreciated that a task, subtask, or sub-subtask may include corrective actions or modules that can be called for itself or a lower-level component, or a higher level program may include corrective actions or modules that can be called for itself or a lower-level component, and querying a database may be calling or invoking such a corrective action or module. For example, if a task includes corrective actions for a subtask, and the subtask fails, the corrective actions may be called by, for example, a command or call to the task which includes the ID of the failed subtask such as, for example, the call "TaskID (NNN)", where "TaskID" calls the task having that ID, and "NNN" directs that task to execute a module which has corrective actions for subtask "NNN".

If at operation 426 this resolves the problem then the subtask ID is popped 428 off of the stack, and the failure of that subtask is logged 430 in the operations log. If at operation 436 the task has more subtasks to execute then a return is made to operation 404. If at operation 436 the task does not have more subtasks to execute then operation 438 of FIG. 4C is commenced.

If at operation 422 no corrective action(s) are specified or if at operation 426 the problem is not resolved, then operation 432 determines whether the failure is a "blocking" failure. A blocking failure may mean, for example, that the task, or another subtask, cannot be successfully performed or completed if this subtask cannot be successfully completed. For example, if the current subtask is simply to make all characters in a row to have the same font, then that is most likely a non-blocking failure for many purposes. If, however, the current subtask is to calculate some accounting values which are to be used in preparation of an audit report, then that is most likely a blocking failure.

If at operation 432 the failure is not a blocking failure then operation 428 is executed. If at operation 432 the failure is, however, a blocking failure, then the failure of that subtask is logged 434 and then operation 444 of FIG. 4C is commenced.

Turning now to FIG. 4C, at this point all of the subtasks have either been completed or failed. If at operation 438 the task has successfully completed its operations then the task ID is popped 440 off the stack. Decision 442 tests whether there were any failures, regardless of whether the failures were successfully resolved or not. If there were no failures then the task ends. If there were any failures then operation 444 invokes a failure notification procedure.

If at operation 438 the task did not successfully complete its operations then correction routine 416 of FIG. 4B is executed 446, but at the task level rather than at the subtask level. If the correction routine 416 is successful (F1) then operation 440 is executed. If the correction routine 416 is not successful (F2) then operation 444 is executed.

A pseudo-code example of the computer instructions might be, for example:

```
(1) Task: Begin. "ID" = T123xxA; "Stack" = Location 1
(2) Push ID: Stack
(3) Call S456
    (a) Subtask: Begin: "ID" = S456
    (b) Push ID: Stack
    (c) ... (other subtask instructions)
    (d) Pop Stack
    (e) End Subtask
(4) Call Search2012
    (a) Subtask: Begin: "ID" = Search2012
    (b) Push ID: Stack
    (c) ... (other subtask instructions)
    (d) Pop Stack
    (e) End Subtask
(5) ... (other task instructions)
(6) Pop Stack
(7) End Task
```

This shows that, preferably, the instruction to push the task or subtask ID onto the stack occurs early, preferably immediately after beginning the task or subtask, and the instruction to pop the task or subtask ID from the stack occurs late, preferably immediately before ending the task/subtask. Thus, if the task and all its subtasks have successfully completed their operations and terminated normally, then the stack will be empty.

Figure 5:
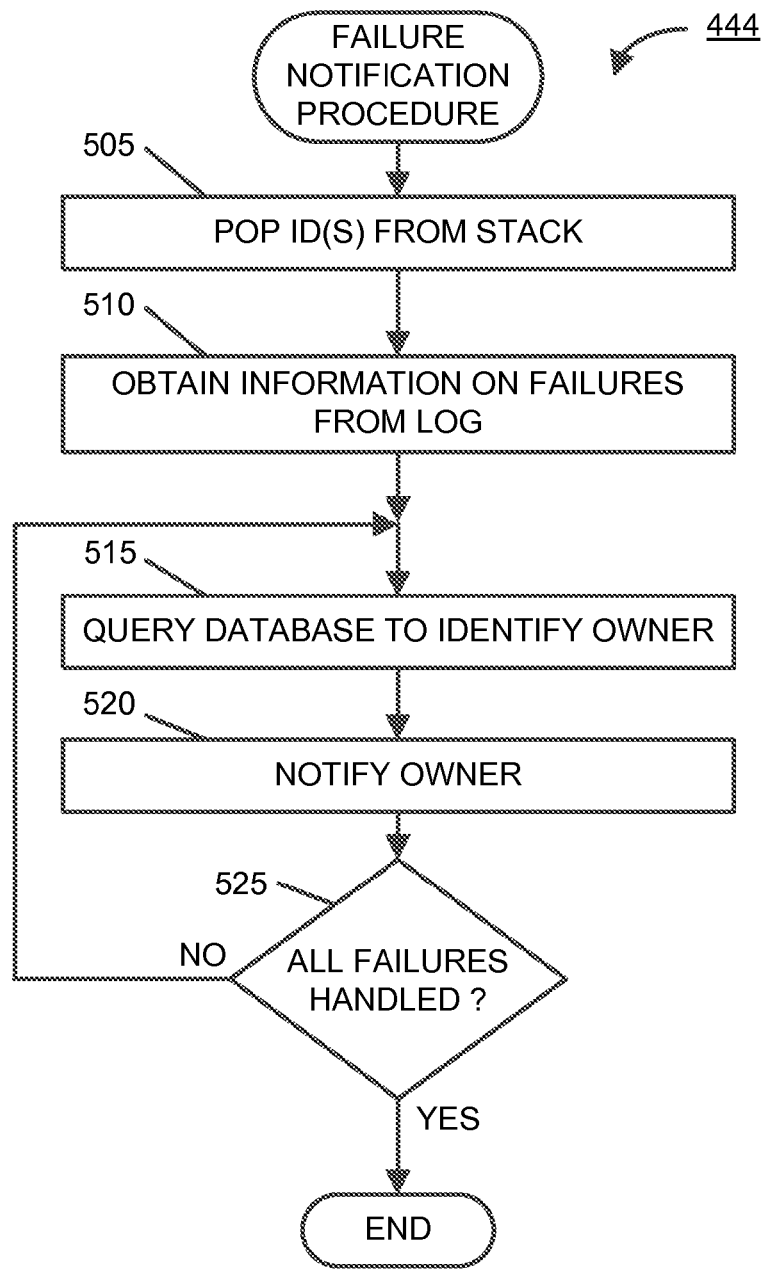
FIG. 5 is a flowchart of an exemplary procedure illustrating the failure notification operation of a server.

FIG. 5 is a flowchart of an exemplary procedure 400 illustrating the failure notification operation 444 of a server 205 or 210. The server pops 505 the ID(s) from the stack to identify the failed components. Using the ID(s), the server obtains 510 information on the failures from the dedicated operations log.

The operations log is preferably "dedicated" in that it contains information as discussed herein, but is separate from other logs, such as system operations logs, security logs, maintenance logs, etc. That information preferably, but not necessarily, includes the ID of the component which failed, the time of the failure, an identification of each component operating at that time, the start time of each component, the end time of each component, error codes associated with each component, a listing of resources called by each component, and/or an identification of subcomponents initiated by each component, and similar information regarding each subcomponent, etc. The server then queries 515 the database to identify the owner of the first failure and obtain pertinent information regarding the owner, and then notifies 520 the owner. Preferably, at operation 520, a notice is also sent to the team which is performing the update or maintenance operations to keep this operations team informed about the status of the update or maintenance operations, problems, etc., so as to minimize the minimize downtime, especially when the owner cannot be contacted or is not available. If the system 14 has a software "bug" tracking system then, if there is a failure, an entry is also made in the in a bug tracking log regarding the failure. The entry may be simply an indicator of the failure, a pointer to a location in the dedicated operations log containing information about the failure, or may a duplicate of some or all of the information in the dedicated operations log. Thus, especially in the case where there are multiple failures, any person responsible for programming, operating, or maintaining the system will have convenient access to information regarding any failure(s).

If at operation 525 all failures have now been handled, then the operation 444 ends. If at operation 525 all failures have not yet been handled, then a return is made to operation 515 for the next failure. Preferably, "first failure" and "next failure" refer to the chronological order of the failures. This, however, is not a requirement and a different ordering procedure for reporting could be used instead. For example, all stack entries could be popped and analyzed and blocking failures could be handled first, and then non-blocking failures. As another example, subtasks could be handled in the order of the number of failures with, for example, the subtask having the most failures being handled first.

Figure 6:
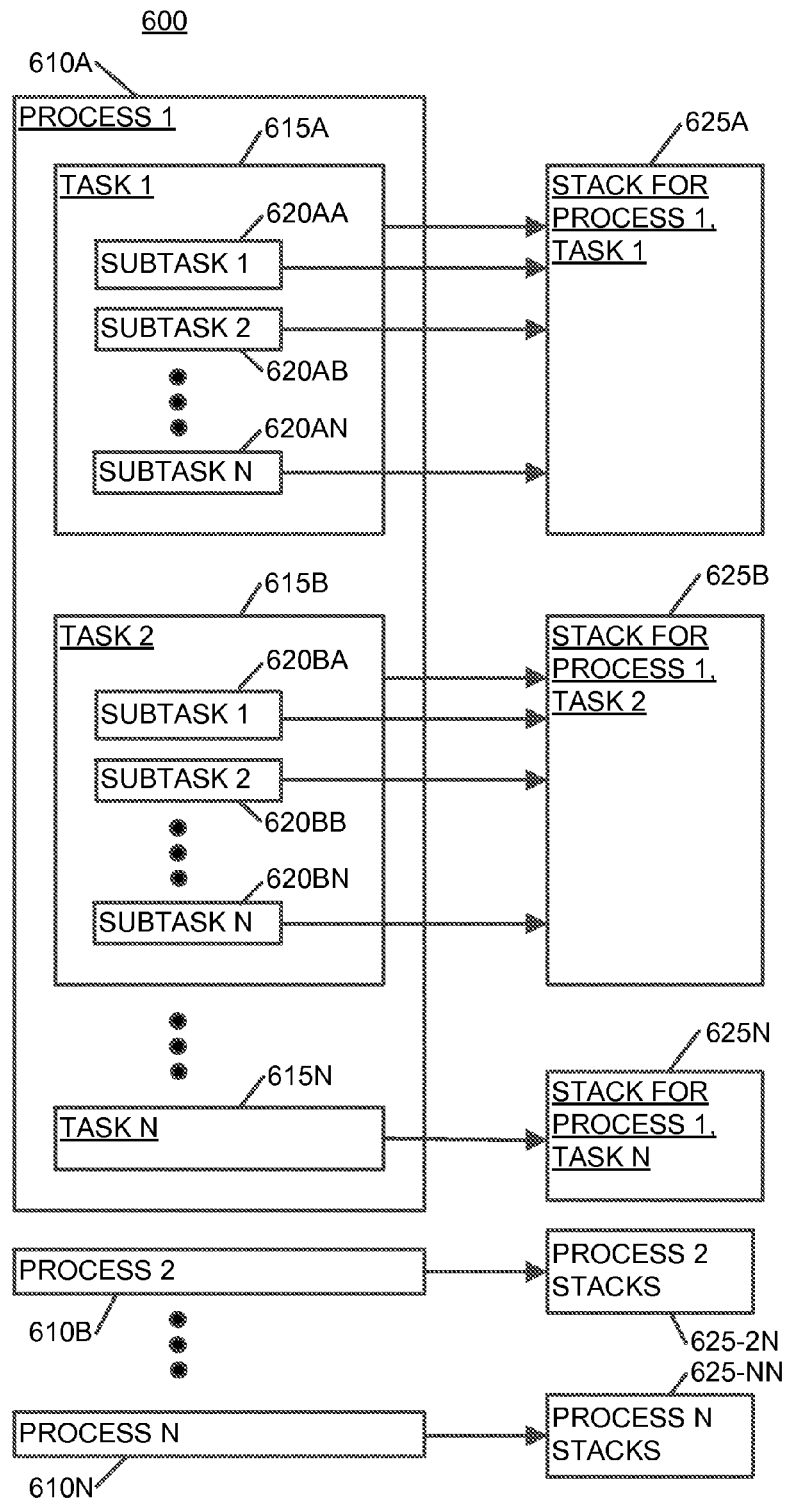
FIG. 6 is an illustration of a possible relationship between processes, tasks, subtasks, and stacks.

FIG. 6 is an illustration of a possible relationship 600 between processes 610, tasks 615, subtasks 620, and stacks 625. Each process 610 may simultaneously run one or more tasks 615, and each task 615 may sequentially run one or more subtasks 620. For example, Process 1 (610A) may simultaneously run multiple tasks 615A-615N, and task 615A may sequentially run subtasks 620AA-620AN, while task 615B is also sequentially running subtasks 620BA-620BN, etc. Also, each task has a stack which is preferably associated only with that task. Thus, task 1 (615A) has an associated stack 625A, task 2 (615B) has an associated stack 625B, etc. Further, the stack for a task is also the same task for the subtasks of that task. Thus, task 1 (615A) and its subtasks 620AA-620AN are all associated with stack 625A, task 2 (615B) and its subtasks 620BA-620BN are all associated with stack 625B, etc.

Therefore, when task 1 (615A) begins operation, it will push its ID onto stack 625A. When subtask 1 (620AA) begins operation, it will push its ID onto stack 625A and if subtask 1 normally ends operation, it will pop its ID off of stack 625A. Once a subtask has completed operation, the next subtask can begin operation. Therefore, once subtask 1 has completed operation, subtask 2 (620AB) can begin operation. When subtask 2 begins operation, it will push its ID onto stack 625A. If subtask 2 normally ends operation, it will pop its ID off of stack 625A. If all subtasks have successfully run, and the task has completed its operation, then the task will pop its ID off of stack 625A and then terminate normally. Thus, the stack 625A will then be empty or null.

Assume now that task 615A begins, pushes its ID onto stack 625A, and calls subtask 620AA, which pushes its ID onto stack 625A. Subtask 620AA successfully completes, pops its ID off of stack 625A, and then terminates normally. Task 615A then calls subtask 620AB, which pushes its ID onto stack 625A. Assume now that subtask 620AB does not terminate normally, so the subtask 620AB will not be able to pop its ID off of stack 625A. The topmost ID in stack 625A will then contain the ID for subtask 620AB, indicating that the problem was associated with, or due to, the subtask 620AB. If the failure was a non-blocking failure then the next subtask 620AC (not shown) can begin. Subtask 620AC will therefore push its ID onto the stack. If subtask 620AC terminates normally then it will pop its ID from the stack. Thus, the ID for subtask 620AB will again be the topmost ID in the stack, which indicates that subtask 620AB did not terminate normally. If subtask 620AC does not terminate normally then it will not be able to pop its ID from the stack, so the stack will then show that both subtask 620AB and 620AC did not terminate normally.

Assume, instead, that all subtasks 620AA-620AN have successfully completed, but that task 615A does not terminate normally, so the task 615A will not be able to pop its ID off of stack 625A. The stack 625A will then contain the ID for task 615A, indicating that the problem was associated with, or due to, the task 615A. If, however, one or more subtasks 620Ax did not terminate normally, and the failure was blocking, then the task 615A will not be able to pop its ID from the stack. In this case, however, it may be presumed that task 615A was not able to terminate due to problems with one or more of the subtasks 620Ax whose IDs appear in the stack before the task's ID.

FIG. 7 is an illustration of the identified relationship 700 between tasks, subtasks, and the owner, such as a responsible person(s) and/or teams. This information is preferably stored in a table located in a database located in, or associated with, one or more devices such that this database will be accessible even in the event that a server crashes, or at least once a crashed server has restarted. If sub-subtasks are involved, then this information will preferably also identify the relationship between sub-subtasks, and the owner, such as a responsible person(s) and/or teams.

As previously indicated above, a stack will contain, at the top of the stack, the identification of the task or subtask that did not terminate normally so it is possible for the system operator on duty at that time to review the stack information to determine the problem component, and then attempt to locate someone who knows something about that component. This, however, would be time-consuming and, in the early hours past midnight, it may be difficult to even establish contact with anyone who might know whom to call about the problem program. It is therefore preferable to automatically identify the owner(s) of that component so that they can notified, either immediately in the case of a blocking problem, that is, an error that brings a process to a complete halt, or at least later in the event of some irregularity, such as repeated attempts to access a database before access is finally obtained.

For example, assume that the process stops due to a non-normal termination, the server will read (pop and then preferably push back) the ID at the top of the stack. Assume also that the ID at the top of the stack is S457B3. The server will query a database to determine the owner of component S457B3. In this case the primary contact person is Joshua T., who is part of Team 6. The server will then automatically send an email and/or text message to Joshua T., preferably but not necessarily, with a predetermined subject line such as, for example, "S457B3 FAILURE", or some other predetermined subject line designed to capture the attention of the recipient and advise as to the general nature of the problem.

The server may also insert, into the body of the email, the last N operations from the dedicated operations log, the name and email address and/or telephone number of the operator on duty, or other information which may help the owner understand and/or resolve the problem. If the primary contact is part of a team which is responsible for that component, the server may also, or instead, send an email or text message to the team. Alternatively, if the "Other Information" cell(s) contain information regarding a secondary responsible party, the server may also "cc" that person on the email. The server may also place a telephone call to the primary contact which delivers a prerecorded message, for example: "URGENT: Component failure; please check your email.", "URGENT: Component failure; please call 425-PPP-SSSS.", "URGENT: Component S457B3 failure; please check your email.", etc.

It may occur that the tasks and subtasks are terminating normally, or even that they are not terminating normally but that the predetermined corrective action(s) resolve the problem, or that certain exceptions or errors are repeatedly occurring. This may not be a sufficiently serious condition to warrant sending a failure notice email or calling the owner at 2 A.M. Therefore, the server may simply send an email to the owner and/or team with a different predetermined subject line, such as but not limited to, the examples above, but without the "URGENT" text, or some other predetermined subject line preferably designed to capture the attention of the owner and advise as to the general nature of the problem, but which also lets the owner know that this is not a critical problem requiring immediate attention. Then, when the owner(s) report for work, they are aware of the problem and can begin investigating the precise cause of the problem and possible solutions to the problem.

It may also occur that the tasks and subtasks are terminating normally, but that certain exceptions or errors are repeatedly occurring, and require action, but there is a known solution or temporary solution, such as closing and restarting the process, task, or subtask. In this case the "OTHER INFORMATION" cells, or some other cells (not shown), may have a link to executable code which performs the correction action.

Preferably, but not necessarily, an email message is sent to the primary contact and/or team advising of the problem, the action that is being taken, a portion of the dedicated operations log, and/or other information preferably designed to capture the attention of the recipient and advise as to the general nature of the problem, but which also lets the recipient know that this is not a critical problem requiring immediate attention, and what action has been taken. Then, when the responsible person(s) report for work, they are aware of the problem and can begin investigating the precise cause of the problem and possible solutions to the problem.

In addition, the relationship table may provide any desired degree of granularity, which may even vary from task to task and subtask to subtask. For example, for one subtask may only list one owner to contact. Another subtask may, however, list one person to contact on weekdays during specified workday hours, and another person to contact on weekdays outside of those specified workday hours, such as a nighttime, and even another person to contact on weekends. Also, the table may specify that one person is to be contacted by telephone only during certain hours, and is to be contacted by email outside of those hours. Also, there may be secondary contacts listed, and contact information for them, for automatic follow-up in the event that the primary contact does not respond (e.g., log in) within a predetermined time.

The dedicated operations log may be separate from the stacks for the various tasks. Also, a task or subtask could push, onto a stack, some or all of the information that would otherwise be in the operations log for that task or subtask or even in the relationship table or database. This method of operation, although possible, is not preferred as numerous push operations would be required to push all of the information onto the stack each time a task or subtask started, and numerous pop operations would be required to remove all of the information from the stack each time a task or subtask ended.

Figure 8:
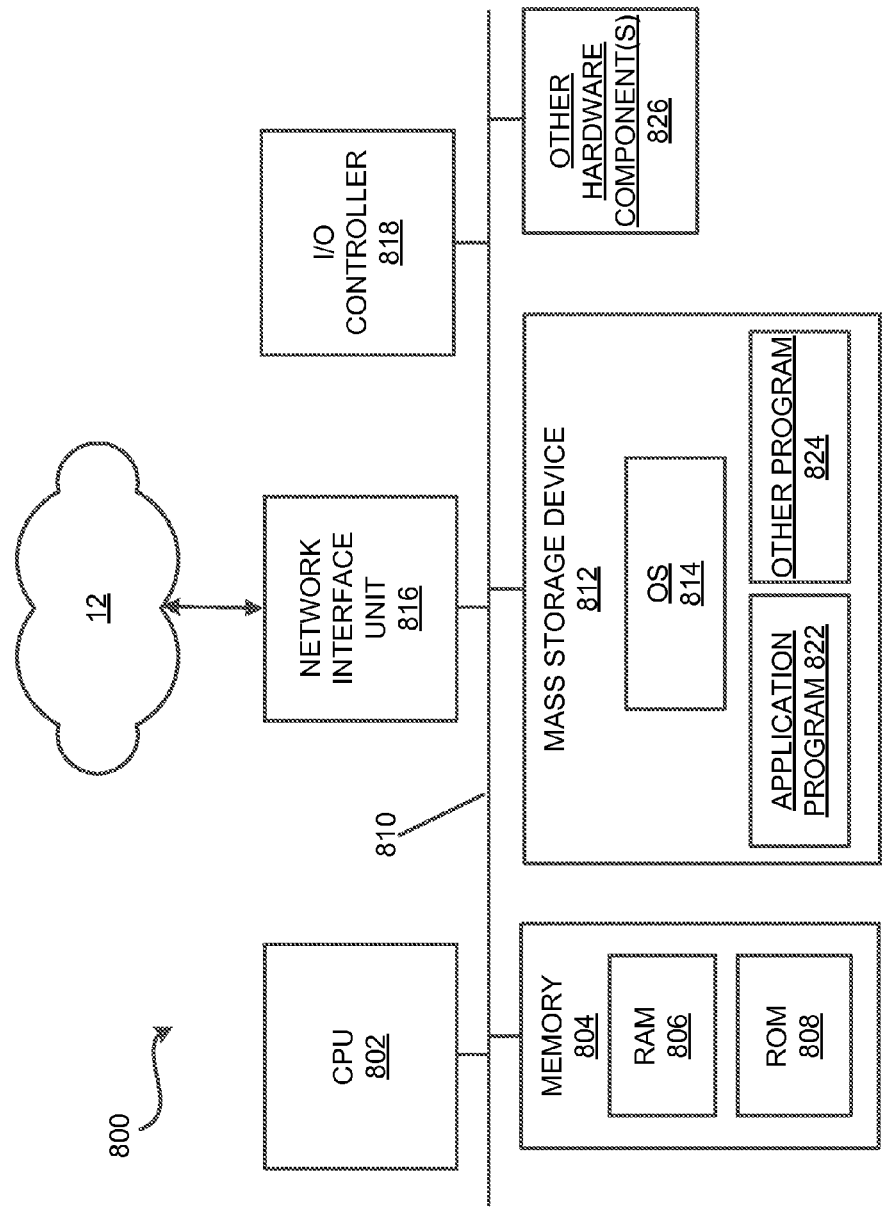
FIG. 8 illustrates exemplary computer architecture for devices capable of executing the procedures described herein.

FIG. 8 illustrates exemplary computer architecture 800 for devices 10, 12 and 14 capable of performing as described herein. Thus, the computer architecture 800 illustrates an exemplary architecture for a host computer, a server computer, a mobile phone, a PDA, a smart phone, a desktop computer, a netbook computer, a tablet computer, and/or a laptop computer. The computer architecture 800 may be utilized to execute any aspects of the software operations presented herein.

The exemplary computer architecture 800 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing the operating system 814, one or more application programs 822 such as for performing the server functions and the functions described herein, and possibly other programs 824, such as security programs, maintenance programs, etc.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, those skilled in the art will appreciate that computer-readable media can be any available computer storage media or communication media that can be accessed by the computer architecture 800.

Although the memory 804 and mass storage device 812 are preferably separate components, the memory 804 could be included in a mass storage device 812. The memory 804 and mass storage device 812 may be collectively considered to be, and referred to as, a memory device.

Other hardware components 826 may also be present. For example, a sensor component, such as a magnetometer, an ambient light sensor, a proximity sensor, an accelerometer, a gyroscope, a global positioning system (GPS) sensor, a microphone or other audio input device, a camera, etc. may be present.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrases "computer storage medium", "communication media", and variations thereof, do not include waves and transitory signals per se which do not have any associated device for the transmission, reception, detection, processing, or storage of the wave or transitory signal.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

According to various embodiments, the computer architecture 800 may operate in a networked environment using logical connections to remote computers and/or servers through a network such as the network. The computer architecture 800 may connect to the network through a network interface unit 816 connected to the bus 810. The network interface unit 816 also may be utilized to connect to other types of networks and remote computer systems. The computer architecture 800 also may include an input/output controller 818 for receiving and processing input from one or more user input devices (not shown) such as, but not limited to, a keyboard, mouse, touch-screen, touchpad, keypad, or electronic stylus. Similarly, the input/output controller 818 may provide output to one or more user display devices (not shown) such as, but not limited to, a display screen, a printer, or other type of output device. A user input device and a user output device may be embodied in the same component, such as a touch-sensitive screen. The user input device and the user output device may be integral with a device, such as in the case of a handheld device, or may be separate components, such as a keyboard, mouse and display used with many desktop systems.

The software components described herein, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. The CPU 802 may be a single processor, or may be a plurality of processors. These computer-executable instructions may transform the CPU 802 by specifying how the CPU 802 transitions between states, thereby transforming the transistors or other discrete hardware elements constituting the CPU 802.

It should be understood that the operations of the exemplary procedures disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated procedures can be ended at any time and need not be performed in its entirety. Some or all operations of the procedures, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, many types of physical transformations take place in the computer architecture in order to store and execute the software components presented herein. Also, the computer architecture may include other types of computing devices, including hand-held computers, embedded computer systems, personal digital assistants, and other types of computing devices known to those skilled in the art. It is also contemplated that the computer architecture may not include all of the components shown herein, may include other components that are not explicitly shown herein, or may utilize an architecture completely different than that shown herein.

The subject matter described above is provided by way of illustration only and are not to be construed as limiting. Various modifications and changes may be made to the subject matter described herein without following the exemplary embodiments and applications illustrated and described herein. Although the subject matter presented herein has been described in language specific to computer structural features, methodological and transformative acts, specific computing machinery, and computer readable media, it is to be understood that the appended claims are not necessarily limited to the specific features, acts, or media described herein. Rather, the specific features, acts and mediums are disclosed as example forms of implementing the claims.

The invention claimed is:

1. A method of operation of a computer, the method comprising:
   starting a task;
   pushing information regarding the task onto a stack;
   at least partially executing the task;
   if the task terminates normally, popping from the stack the information regarding the task;
   if the task does not terminate normally, then obtaining the information from the stack to identify the task, and performing a predetermined action related to the task, the predetermined action comprising:
      searching a database to identify at least one person or at least one team having responsibility for the task; and
      sending at least some information about the task to the identified person or team.

2. The method of claim 1 wherein performing the predetermined action further comprises at least one of: logging information about the non-normal termination; sending a notice regarding the non-normal termination; delaying sending a notice regarding the non-normal termination until a predetermined event subsequently occurs; or performing a predetermined corrective action.

3. The method of claim 1 wherein performing the predetermined action further comprises:
   receiving information regarding the non-normal termination, the information comprising an error code;
   searching a database for information regarding a corrective action responsive to the error code; and
   executing the corrective action.

4. The method of claim 1 and further comprising:
   starting a subtask;
   pushing information regarding the subtask onto the stack;
   at least partially executing the subtask;
   if the subtask terminates normally, popping from the stack the information regarding the subtask;
   if the subtask does not terminate normally, then obtaining the information from the stack to identify the subtask, and performing a predetermined action related to the subtask.

5. The method of claim 4 wherein performing the predetermined action related to the subtask comprises:
   using the information regarding the subtask to search a database to identify at least one person or at least one team having responsibility for the subtask; and
   sending at least some information about the subtask to the identified person or team.

6. The method of claim 5 wherein sending at least some information about the subtask comprises sending an identification of the subtask and the nature of an error associated with the subtask.

7. The method of claim 4 and further comprising logging at least two of: an identification of the task, the start time of the task, the end time of the task, error codes associated with the task, a listing of resources called by the task, an identification of subtasks initiated by the task, the start time of each subtask, the end time of each subtask, error codes associated with each subtask, a listing of resources called by each subtask, the person or team having responsibility for the task, or the person or team having responsibility for the subtask.

8. The method of claim 1 and further comprising:
   starting an additional task;
   pushing information regarding the additional task onto a stack, each task being associated with a stack which is distinct from the stack for any other task;
   at least partially executing the additional task;
   if the additional task terminates normally, popping the information regarding the additional task from the stack for the additional task;
   if the additional task does not terminate normally, then obtaining, from the stack for the additional task, information to identify the additional task, and performing a predetermined action related to the additional task.

9. The method of claim 1 wherein pushing information regarding the task onto the stack comprises pushing at least one of a task name or process identifier onto the stack.

10. A computer system comprising:
    a processor;
    a memory operatively coupled to the processor; and at least one program module which executes in the processor from the memory and which, when executed by the processor, causes the computer system to:
start a task;
push information regarding the task onto a stack;
at least partially execute the task;
if the task terminates normally, then to pop from the stack the information regarding the task; and
if the task does not terminate normally, then to obtain the information from the stack to identify the task, and to perform a predetermined action related to the task, the predetermined action comprising:
searching a database to identify at least one person or at least one team having responsibility for the task; and
sending at least some information about the task to the identified person or team.

11. The computer system of claim 10, wherein the module, when executed by the processor, further causes the computer system to at least one of: log information about the non-normal termination; send a notice regarding the non-normal termination; delay sending a notice regarding the non-normal termination until a predetermined event subsequently occurs; or perform a predetermined corrective action.

12. The computer system of claim 10, wherein the module, when executed by the processor, further causes the computer system to:
receive information regarding the non-normal termination, the information comprising an error code;
search a database for information regarding a corrective action responsive to the error code; and
execute the corrective action.

13. The computer system of claim 10, wherein the module, when executed by the processor, further causes the computer system to:
start a subtask;
push information regarding the subtask onto the stack;
at least partially execute the subtask;
if the subtask terminates normally, then to pop from the stack the information regarding the subtask;
if the subtask does not terminate normally, then to obtain the information from the stack to identify the subtask, and to perform a predetermined action related to the subtask.

14. The computer system of claim 13, wherein the module, when executed by the processor, further causes the computer system to:
use the information regarding the subtask to search a database to identify at least one person or at least one team having responsibility for the subtask; and
send at least some information about the subtask to the identified person or team.

15. The computer system of claim 14, wherein the module, when executed by the processor, further causes the computer system to send an identification of the subtask and the nature of an error associated with the subtask.

16. The computer system of claim 13, wherein the module, when executed by the processor, further causes the computer system to log at least two of: an identification of the task, the start time of the task, the end time of the task, error codes associated with the task, a listing of resources called by the task, an identification of subtasks initiated by the task, the start time of each subtask, the end time of each subtask, error codes associated with each subtask, a listing of resources called by each subtask, the person or team having responsibility for the task, or the person or team having responsibility for the subtask.

17. The computer system of claim 10, wherein the module, when executed by the processor, further causes the computer system to:
start an additional task;
push information regarding the additional task onto a stack, each task being associated with a stack which is distinct from the stack for any other task;
at least partially execute the additional task;
if the additional task terminates normally, then to pop, from the stack for the additional task, information regarding the additional task;
if the additional task does not terminate normally, then to obtain, from the stack for the additional task, information to identify the additional task, and to perform a predetermined action related to the additional task.

18. A server comprising:
a memory device containing operating instructions;
a network interface unit;
a processor, communicatively coupled to the memory device and to the network interface unit, the processor executing the operating instructions to:
start a plurality of tasks;
push information regarding each task onto an associated stack;
at least partially execute each task;
if an at least partially executed task terminates normally, then to pop from the stack the information regarding that task;
if the at least partially executed task does not terminate normally, then to obtain the information from the stack to identify the task, and to perform a predetermined action related to that task, the predetermined action comprising:
searching a database to identify at least one person or at least one team having responsibility for that task; and
sending at least some information about that task to the identified person or team.

* * * * *